A. R. TUPPER.
GO-CART.
APPLICATION FILED MAY 8, 1912.

1,054,949.

Patented Mar. 4, 1913.
2 SHEETS—SHEET 1.

Witnesses

Inventor
Albert R. Tupper.
By Joshua R. H. Potts
Attorney

A. R. TUPPER.
GO-CART.
APPLICATION FILED MAY 8, 1912.

1,054,949.

Patented Mar. 4, 1913.
2 SHEETS—SHEET 2.

Inventor
Albert R. Tupper.

Witnesses

By Joshua R. H. Potts
Attorney

UNITED STATES PATENT OFFICE.

ALBERT R. TUPPER, OF BINGHAMTON, NEW YORK.

GO-CART.

1,054,949.

Specification of Letters Patent.

Patented Mar. 4, 1913.

Application filed May 8, 1912. Serial No. 695,908.

*To all whom it may concern:*

Be it known that I, ALBERT R. TUPPER, a citizen of the United States, residing at Binghamton, county of Broome, and State of New York, have invented certain new and useful Improvements in Go-Carts, of which the following is a specification.

My invention relates to go-carts or children's sulkies, and the object of my invention is to provide a vehicle of the class mentioned which shall be light in weight and easy to manipulate, and which shall be comfortable to the occupant.

A further object of my invention is to provide a vehicle of the class mentioned which may be either pushed or drawn and in which the child shall face the direction in which it is traveling.

A further object of my invention is to provide a device as mentioned of such character that the same may be adjusted to comfortably accommodate children of different heights.

A further object of my invention is to provide in a light vehicle improved means for attaching the axle to the frame.

Other objects will appear hereinafter.

With these objects in view my invention consists generally in a resilient frame mounted upon wheels, a foot rest on said frame, and a seat adjustably mounted on said frame with relation to said foot rest.

My invention further consists in a vehicle comprising a resilient frame mounted upon wheels, a foot rest on said frame, a seat adjustably mounted on said frame with relation to said foot rest, a second foot rest extending in the opposite direction from the seat and a reversible back for said seat.

My invention further consists in a frame, a pair of brackets fixed to said frame and each formed of a metal strip, said strip being longitudinally slotted and the metal upon opposite sides of the strip being bent in opposite directions to form a sleeve, and an axle arranged in the sleeves thus formed.

My invention further consists in various details of construction and arrangements of parts all as will be fully described hereinafter and particularly pointed out in the claims.

My invention will be more readily understood by reference to the accompanying drawings forming a part of this specification and in which—

Figure 1:
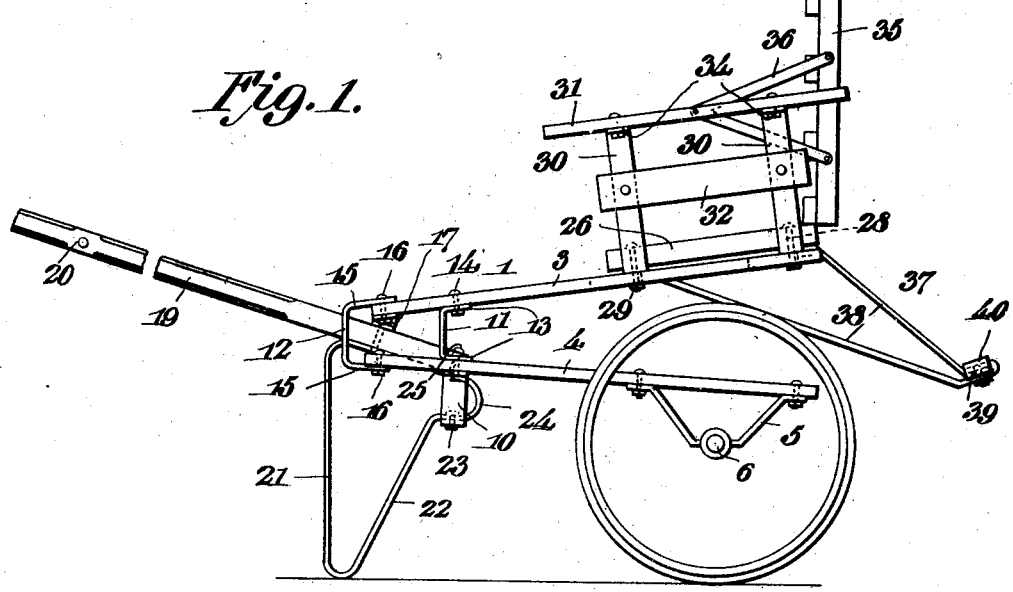
Figure 2:
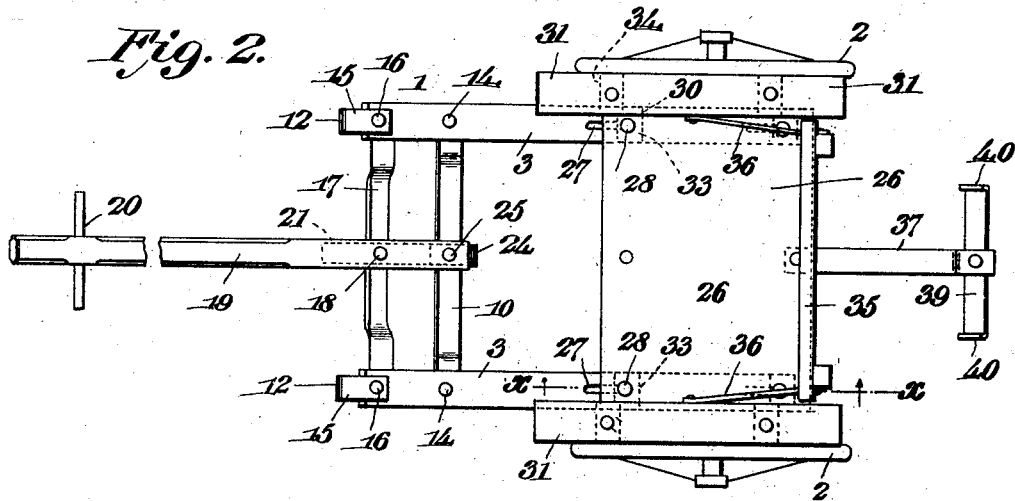
Figure 3:
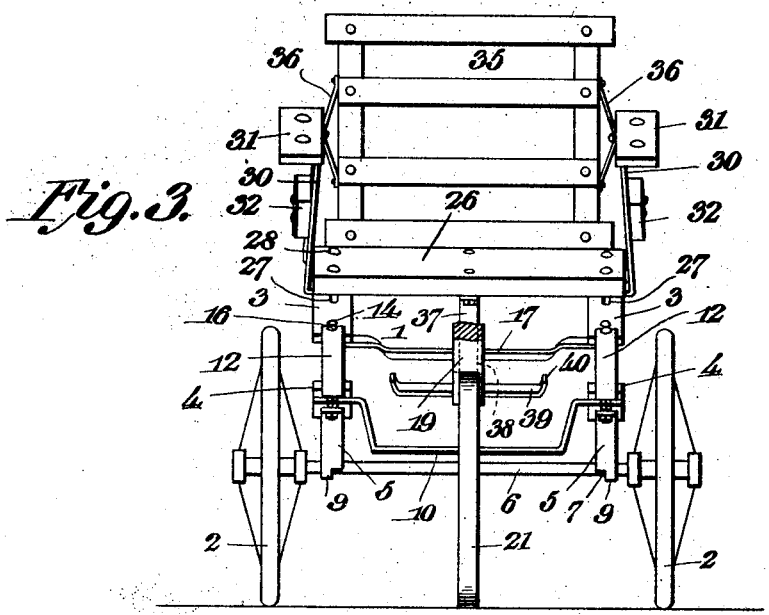
Figure 4:
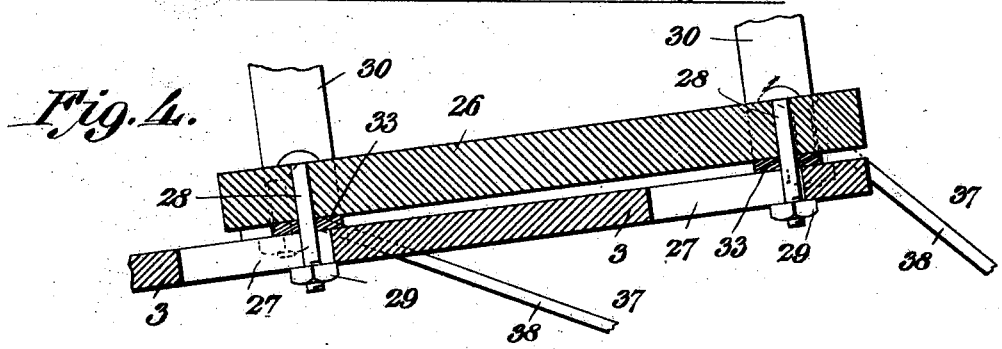
Figure 5:
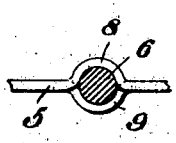
Figure 6:
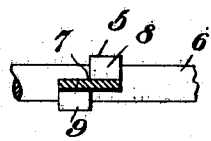

Figure 1 is a side elevation of a go-cart or sulky embodying my invention, Fig. 2 is a plan view thereof, Fig. 3 is a front elevation of the same, Fig. 4 is a vertical longitudinal section on substantially the line x—x of Fig. 2, and Figs. 5 and 6 are detailed views illustrating the manner of connecting the axle to the frame.

Referring now to the drawings 1 indicates the frame of the device mounted upon a pair of wheels 2. The frame 1 comprises upper and lower frame parts consisting of parallel bars 3—3 and 4—4 respectively. The lower bars 4—4 are each provided with a depending bracket 5 in which the axle 6 of the wheels 2 is mounted. The brackets 5 are each formed of a single metal strip downwardly bowed as illustrated in Fig. 1 and longitudinally slit as at 7 for a short distance at substantially mid-way its length. A portion of the metal upon one side of the slit is bent upwardly as at 8 and that on the other side bent downwardly as at 9, the portions 8 and 9 together forming sleeves in which the axle 6 is secured. The rear ends of the bars 4 are rigidly connected by the axle 6 in the manner above described, and a transverse bar 10 rigidly connects the bars 4 adjacent their forward ends.

The bars 3 are arranged directly above the respective bars 4 and are connected thereto in such a manner as to form a resilient frame. To this end struts or braces 11 are interposed between the bars 3 and 4 adjacent their forward ends and the extreme forward ends are connected by a spring member 12, which together with the resiliency of the bars 3 and 4, constitute a frame of great resiliency. The struts 11 are preferably formed of short pieces of strap iron having their ends bent as at 13 to engage the adjacent faces of the bars 3 and 4 and secured thereto as by rivets or bolts 14. The spring members 12 are also formed of strap metal and are U-shaped, the ends of the substantially parallel arms 15 thereof being secured to the ends of the bars 3 and 4 as at 16. By connecting the bars 3 and 4 to the ends of the arms 15 the resiliency of the members 12 is obtained and utilized. The forward ends of the bars 3 are rigidly connected by a transverse member 17, preferably formed of strap iron. The members 10 and 17 are both adapted to serve as foot rests.

Secured to the center of the member 17, as by a bolt 18, is a forward and upwardly extended pole 19 terminating in a grip or handle 20. The rear end of the pole 19 extends beyond the member 17 and is connected to the member 10 in a manner hereinafter described.

21 indicates a forward leg or brace to maintain the device in upright position. This comprises a strap iron secured at one end to the pole 19 preferably directly beneath the member 17, the bolt 18 serving to hold the same, then extending downwardly a sufficient distance to form a brace of the proper length, then bent upwardly, extending upwardly and rearwardly to the center of the brace 10 to which it is secured as by a bolt 23, terminating in an upwardly and forwardly curved spring portion 24, the end of which, is secured by a bolt or rivet 25 to the rear end of the pole 19. It should be noted that the member 10 is downwardly arched below the plane of the members 4 in order to space the same from the end of the pole 19 to afford ample space for the spring portion 24.

26 indicates the seat which is arranged upon the rearward ends of the frame bars 3 and adjustably secured thereto. To this end the bars 3 are provided with longitudinally disposed slots 27, and bolts 28, fixed in the seat 26 extend through the slots 27 and are provided with nuts 29 for securing the seat in adjusted position. The seat is provided with sides comprising vertical members 30, arms 31 and intermediate longitudinal members 32. The vertical members 30 are preferably formed of strap iron having their lower ends turned inwardly between the seat 26 and the members 3 as indicated at 33 and their upper ends bent outwardly and secured to the under face of the arms 31 as at 34. The bolts 28 extend through the inturned lower ends 33 as shown clearly in Fig. 4. 35 indicates a back for the seat which is reversibly mounted by means of V-shaped brace arms 36 pivotally connected to the arms 31.

Secured to the seat 26 is a downwardly and rearwardly extending bracket 37 formed of a single piece of strap iron bent upon itself to form downwardly converging arms 38, between the extreme ends of which is secured a transverse bar or foot rest 39 having upturned outer ends 40.

It is obvious that the device above described is as light in weight as is consistent with strength and durability and that it possesses sufficient resiliency to make a comfortable vehicle for the occupant. By reversing the back, the device may be either pushed or drawn and the child faced in the direction it is traveling. By adjusting the seat on the frame members 3 the device may be adjusted with relation to the foot rests 10 and 17 to accommodate children of different heights.

Having described my invention what I claim as new and desire to secure by Letters Patent is:—

1. A go-cart comprising a resilient frame mounted upon wheels, a foot rest fixed to the forward portion of said frame, a seat adjustably mounted on said frame with relation to said foot rest, a rearwardly projecting foot rest fixed to said seat, and a reversible back for said seat, substantially as described.

2. A go-cart comprising a frame consisting of a pair of rigidly connected longitudinally disposed bars mounted upon wheels, a pair of longitudinally disposed bars arranged above the first said bars, struts spacing the last mentioned bars from the respective first mentioned bars adjacent one end, spring members connecting the adjacent ends of said bars, a foot rest fixed to said frame and a seat mounted upon the free ends of the last said bars, substantially as described.

3. In a go-cart a frame comprising a pair of longitudinally disposed bars mounted upon wheels, a brace bar connecting said bars adjacent their forward ends, a second pair of longitudinally disposed bars arranged above the first mentioned pair, spring members connecting the forward ends of each of the second pair with the corresponding ends of the lower pair, struts spacing said bars apart adjacent said ends, a transverse member connecting the forward ends of the second mentioned pair of bars, a pole or tongue secured adjacent one end to said transverse member and a spring connection between the end of said pole and said brace bar, substantially as described.

In testimony whereof I have signed my name to this specification in the presence of two subscribing witnesses.

ALBERT R. TUPPER.

Witnesses:
J. R. WEEKS,
JNO. W. PAYNE